United States Patent [19]
Turkowski

[11] Patent Number: 5,444,835
[45] Date of Patent: Aug. 22, 1995

[54] APPARATUS AND METHOD FOR FORMING A COMPOSITE IMAGE PIXEL THROUGH PIXEL BLENDING

[75] Inventor: Kenneth E. Turkowski, Menlo Park, Calif.

[73] Assignee: Apple Computer, Inc., Cupertino, Calif.

[21] Appl. No.: 116,115

[22] Filed: Sep. 2, 1993

[51] Int. Cl.6 .................. G06F 15/00; G06F 3/153
[52] U.S. Cl. .................................................. 395/135
[58] Field of Search ............. 395/135, 131, 133; 358/30, 37, 80; 345/113, 114, 153

[56] References Cited

U.S. PATENT DOCUMENTS

| | | | |
|---|---|---|---|
| 4,641,255 | 2/1987 | Hobmann | 364/522 |
| 4,704,605 | 11/1987 | Edelson | 340/728 |
| 4,982,343 | 1/1991 | Hourvitz et al. | 364/521 |
| 5,003,491 | 3/1991 | Heckt | 364/518 |

Primary Examiner—Phu K. Nguyen
Attorney, Agent, or Firm—Greg T. Sueoka

[57] ABSTRACT

An apparatus for combining a foreground pixel signal and a background pixel signal according to a blending factor signal to generate a composite pixel signal comprises first, second, and third registers; a signal selecting multiplier; and at least one adder. The first, second, and third registers store the foreground pixel signal, the background pixel signal, and the blending factor signal, respectively. The signal selecting multiplier uses the signal within the third register to selectively shift and add the signals within the first and second registers, resulting in a compound pixel signal. Each adder is used to combine the compound pixel signal with a correction signal, producing an approximation signal. A subset of bits within the approximation signal correspond to the composite pixel signal.

22 Claims, 7 Drawing Sheets

APPARATUS AND METHOD FOR FORMING A COMPOSITE IMAGE PIXEL THROUGH PIXEL BLENDING

BACKGROUND OF THE INVENTION

1. Field of the Invention

The present invention relates generally to image processing, and more particularly to forming a composite image pixel from two separate images. Still more particularly, the present invention is a circuit and method for forming a composite image pixel by blending pixels from each separate image.

2. Description of the Background Art

An image to be displayed on a computer screen or video monitor comprises an array of picture elements (pixels), where each pixel comprises a binary signal corresponding to a plurality of characteristics such as color or shading information. Often, two or more images must be combined via a blending operation to form a single composite image. In forming the composite image, a first image is designated as a foreground image, and a second image is designated as a background image. The foreground image and the background image are then combined on a pixel-by-pixel basis relative to a blending factor. The blending factor specifies the extent to which a given foreground image pixel is weighted relative to the corresponding background image pixel in producing the composite image pixel. The foreground image pixel is represented by an N-bit foreground pixel signal that is considered to be either a fixed-point fractional value between 0 and 1, or an integral value ranging from 0 to $(2^N-1)$. The background image pixel and the composite image pixel are likewise represented by N-bit background pixel and N-bit composite pixel signals, respectively. The fundamental operations required in blending comprise: scaling the foreground pixel signal by the blending factor; scaling the background pixel signal by one minus the blending factor; and forming the composite pixel signal by combining the appropriately scaled foreground and background pixel signals. Each scaling in the blending comprises a multiplication operation, and the signal combination comprises an addition operation.

In certain image processing applications, the amount of time available for performing the calculations required for realistically displaying an image transformation is severely limited. Current technology has made image sizes of 1024×768, or 786,432 pixels commonplace. Blending the pixels of two images to form a composite image must be done on a pixel-by-pixel basis and therefore requires millions of computational operations. Computational time constraints are particularly severe in interactive computer graphics situations, in which actions performed by a computer user influence or direct entire sequences of displayed images. Blending is frequently required in such situations, and must be performed as quickly as possible.

The blending factor is typically represented as an M-bit signal having a fixed-point fractional value between 0 and 1. An alternative integer-based representation of the blending factor comprises the ratio of a first M-bit blending factor signal corresponding to an integer between 0 and $(2^M-1)$, and a second M-bit blending factor signal corresponding to the largest signal value that can be represented with M bits, namely $(2^M-1)$. Using this representation of the blending factor, the operations required to implement a given blending comprise: multiplication of the binary foreground pixel signal by the first blending factor signal; multiplication of the background pixel signal by the second blending factor signal minus the first blending factor signal; addition of the appropriately multiplied foreground and background pixel signals; and normalization of the combination relative to the second-blending factor signal. Thus, each pixel blending requires a total of four operations.

Since the second blending factor signal corresponds to a value of $(2^M-1)$, the normalization step within the four operations indicated above is a division. A division operation is much slower than the scaling and additive operations performed during the blending, and is therefore undesirable. The prior art has attempted to solve this problem by using an approximate normalization signal corresponding to a value of $2^M$. Normalization by $2^M$ simply corresponds to an M-bit right shift applied to a binary signal, which can be performed quickly. However, this approximation introduces an error into the blended pixel. When multiple blendings occur, such errors can accumulate rapidly. This in turn leads to an inaccurate composite pixel signal that has an undesirable appearance when displayed.

Figure 1:
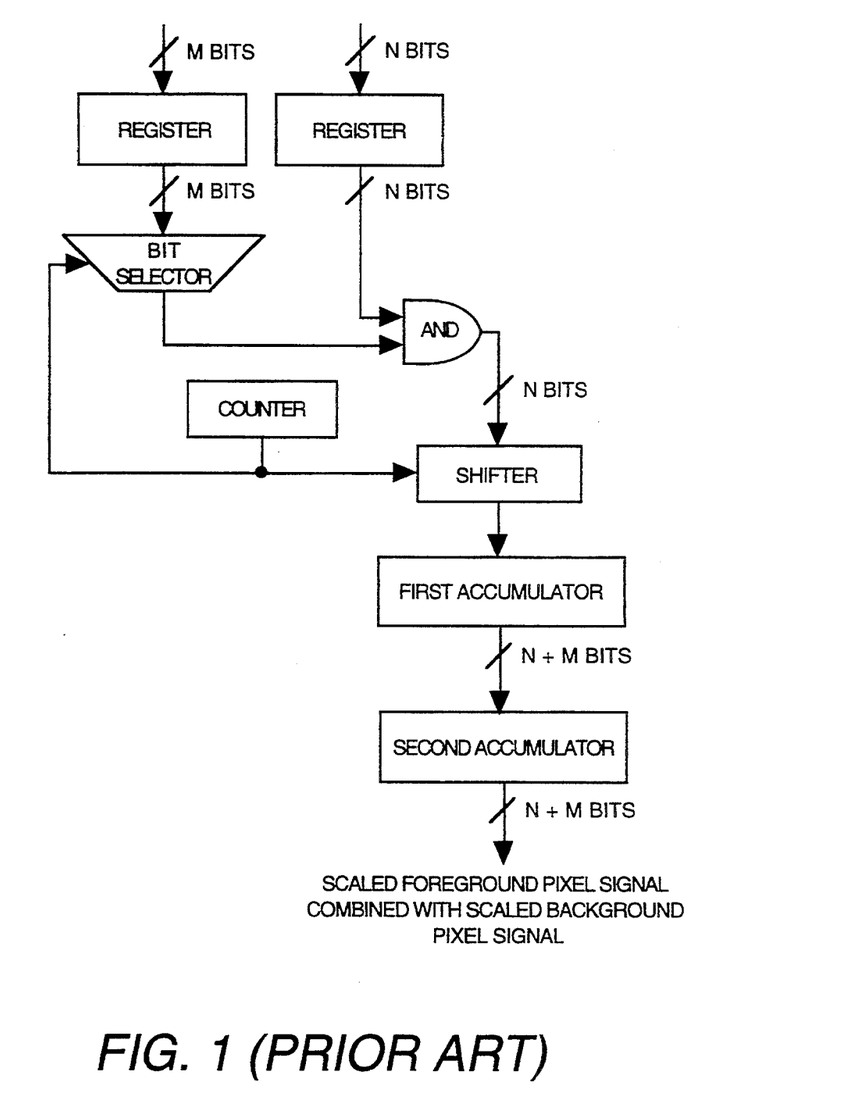
FIG. 1 is a block diagram of a prior art circuit for combining foreground and background pixel signals.

Referring now to FIG. 1, a prior art circuit used to form a composite pixel through pixel blending is shown. The prior art circuit accepts only two input signals, whereas blending requires three input signals corresponding to the foreground pixel signal, the background pixel signal, and the blending factor signal. Therefore, the circuit of FIG. I requires that the multiplications in the blending are performed separately. Each multiplication generates an intermediate result. For example, a first intermediate result is generated after the foreground pixel signal is multiplied by the first blending factor signal. A second intermediate result is generated after the multiplication of the background pixel signal by the second blending factor signal.

In the generation of the first intermediate result, the prior art circuit uses a bit selector to select a first bit within the blending factor signal. The selected bit is used in a logical AND operation to produce a first partial product signal comprising the foreground pixel signal. A shifter next shifts the first partial product signal according to the position the selected bit occupies within the blending factor signal, after which the first partial product signal is stored in a first accumulator. The bit selector and the shifter are both controlled by a counter, where the output of the counter indicates which bit within the blending factor signal is the selected bit. After the first partial product signal has been accumulated, the counter is incremented and another bit within the blending factor signal becomes the selected bit. Each bit within the blending factor signal is used in the manner described above to generate a corresponding partial product signal. The first accumulator combines each newly-generated partial product signal to form a sum of the previously generated partial product signals. Therefore, if the blending factor signal comprises M bits, the first intermediate result is M partial product signals that have been appropriately shifted and accumulated. After each of the M partial product signals have been shifted and accumulated to form the first intermediate result, the first intermediate result is stored in a second accumulator.

Next, the background pixel signal and the second blending factor signal are applied to the prior art circuit to generate a second intermediate result. The generation of the second intermediate result occurs in the same manner as the generation of the first intermediate result. After the second intermediate result has been stored in the first accumulator, it is accumulated in the second accumulator. The contents of the second accumulator thus comprise the foreground pixel signal multiplied by the first blending factor signal, plus the background pixel signal multiplied by the second blending factor signal.

In the circuit of the prior art, each multiplication is performed separately, one after the other. Then the signals generated by each multiplication are combined. Furthermore, each multiplication comprises many operations. Therefore, performing each multiplication sequentially requires significantly more computation time than if each multiplication were performed simultaneously. Simultaneous performance of each multiplication is possible if all the circuit elements were duplicated and added to the circuit of FIG. 1, thereby creating a circuit which could multiply the first blending factor signal by the foreground pixel signal concurrent with the multiplication of the second blending factor signal by the background pixel signal. However, the addition of such circuit elements greatly increases the area of the circuit, the circuit wiring complexity, and the cost of circuit manufacture.

What is needed is an apparatus and method for forming a composite image pixel through pixel blending that requires significantly less computation time to form a composite image pixel than in prior art implementations, maintains an acceptable degree of composite pixel signal accuracy, and simultaneously performs blending operations without adversely affecting implementation complexity or cost.

SUMMARY OF THE INVENTION

The present invention is an apparatus or circuit and method for quickly forming a composite image pixel through pixel blending. Accuracy of blending in the composite image pixel is maintained to a predetermined acceptable degree. In addition, blending operations are performed simultaneously through use of a signal selecting multiplier which contributes only one intermediate result to the entire blending process. The pixel blending method of the present invention comprises the combination of a foreground pixel with a background pixel according to a blending factor. The foreground and background pixels are represented by an N-bit foreground pixel signal and an N-bit background pixel signal, respectively, and the blending factor is represented by an M-bit blending factor signal. The result of the pixel blending is an N-bit composite pixel signal representing one pixel within the composite image.

The circuit of the present invention comprises a first register for storing the foreground pixel signal; a second register for storing the background pixel signal; a third register for storing the blending factor signal; a signal selecting multiplier for appropriately scaling the foreground pixel signal and the background pixel signal relative to the blending factor signal and additively combining them after the scaling; and a plurality of adders for modifying the signal generated by the signal selecting multiplier in order to quickly perform a normalization which maintains an acceptable degree of accuracy. Each register is coupled to the signal selecting multiplier, which is in turn coupled to a first adder within the plurality of adders. The signal selecting multiplier comprises at least one multiplexor for selectively generating one or more partial product signals, and a signal summing means for additively combining the partial product signals. At least one multiplexor is coupled to each register, and at least one multiplexor is coupled to the signal summing means. The signal summing means is further coupled to the first adder within the plurality of adders. The appropriate scaling of the foreground pixel signal and of the background pixel signal followed by their additive combination after the scaling is performed in one operation. This generates only one intermediate result, and thereby significantly reduces the time required for forming the composite image pixel.

The method of the present invention comprises the steps of: retrieving an indication signal using the blending factor signal; determining which pixel the indication signal corresponds to; incorporating either the foreground pixel signal or the background pixel signal into a compound pixel signal; and generating a composite pixel signal from the compound pixel signal. A preferred method of the present invention comprises the steps of: loading a first register with the foreground pixel signal, loading a second register with the background pixel signal, and loading a third register with the blending factor signal; multiplexing the outputs of the first and second registers based upon the blending factor signal in order to produce a plurality of partial product signals; combining the partial product signals to produce a compound pixel signal; combining the compound pixel signal with one or more correction signals comprising shifted versions of the compound pixel signal to produce an approximation signal; combining the approximation signal with a rounding signal; and creating the composite pixel signal from one or more bits comprising the approximation signal.

DETAILED DESCRIPTION OF THE PREFERRED EMBODIMENTS

The present invention is an apparatus or circuit and method for forming a composite image pixel through pixel blending. In the formation of a composite image, a first image is defined as the foreground image, and a second image is defined as the background image. These images are combined relative to a blending factor. The foreground image preferably comprises an array of pixels, each of which is represented by an N-bit foreground pixel signal. The background image and the composite image are likewise represented by N-bit background pixel and composite pixel signals, respectively. The blending factor is represented by an M-bit blending factor signal.

The present invention is implemented on a computer system having a CPU, an input device, a graphics output or display, a given amount of RAM and ROM memory, and a data storage means. In a hardware implementation, the computer system further comprises a circuit constructed in accordance with the present invention. The present invention may also be implemented as a sequence of computer program steps stored in RAM. An exemplary computer system is that of an Apple personal computer having a Motorola MC68040 CPU, a 1024×768 graphics display, 8 Mb of RAM, and a 40 Mb or larger hard disk drive.

In the present invention, the scalings applied to the foreground pixel signal and to the background pixel signal, as well as their combination after scaling, are performed in one operation. In the blending operation, the background pixel signal is scaled relative to the largest signal value that can be represented with M bits, $(2^M-1)$, minus the blending factor signal. If the largest signal value corresponding to M bits is defined as $k_{max}$, and the blending factor signal is defined as k, the background pixel signal is scaled by $(k_{max}-k)$. Since both k and $k_{max}$ are represented with binary numbers, $(k_{max}-k)$ is equivalent to the bitwise complement of k, herein referred to as $\bar{k}$. Thus, the blending operation performed by the present invention comprises a scaling of the foreground pixel signal relative to k, and a scaling of the background pixel signal relative to $\bar{k}$. The scaled foreground and background pixel signals are then additively combined.

The blending factor signal k and its complement $\bar{k}$ are represented by a plurality of bits, each bit corresponding to a value of zero or one multiplied by a given power of two. The scaling of the foreground pixel signal by k and of the background pixel signal by $\bar{k}$ can therefore be interpreted in terms of the appropriate bits comprising k and $\bar{k}$. In scaling the foreground pixel signal by k, bits corresponding to a value of zero contribute a value of zero to the scaling, whereas bits corresponding to a value of one contribute the value of the entire foreground pixel signal multiplied by the given power of two to the scaling. The scaling of the background pixel signal by $\bar{k}$ functions in a corresponding manner. Since corresponding bits within k and $\bar{k}$ correspond to opposite values, if the foreground pixel signal contributes to the blending for a given bit within k, the background pixel signal does not contribute to the blending at all. The present invention therefore selects either the foreground pixel signal or the background pixel signal for incorporation into a summation based upon the bits comprising k and $\bar{k}$. As each bit within k and $\bar{k}$ corresponds to a binary value multiplied by a given power of two, the selected foreground or background pixel signal is shifted by a number of bit positions indicated by the given power of two prior to its incorporation into the summation. The foreground pixel signal and the background pixel signal are thus scaled and incorporated into the summation in a single operation.

The result of the summation is a compound pixel signal comprising shifted foreground and/or background pixel signals. The blending factor signal k and its complement $\bar{k}$ comprise M bits, and the foreground and background pixel signals comprise N bits. Therefore, the compound pixel signal is comprised of M shifted foreground pixel or background pixel signals. This in turn means that the compound pixel signal comprises (N+M) bits.

The blending factor signal is represented by M bits and corresponds to an integer in the present invention, whereas the blending actually corresponds to a fractional scaling of the foreground and background pixel signals. Therefore, the compound pixel signal must be normalized relative to the maximum signal value that can be represented with M binary bits, or $(2^M-1)$. Direct normalization by $(2^M-1)$ is undesirable due to the computational time required to perform a division operation. The $(2^M-1)$ normalization can be approximated to an acceptable degree of accuracy by summing the compound pixel signal with one or more correction signals to produce an approximation signal, where each correction signal comprises the compound pixel signal right-shifted by a multiple of M bit positions. Each correction signal causes the approximation signal to more closely approach a value corresponding to the $(2^M-1)$ normalization. As the compound pixel signal comprises (N+M) bit positions, each correction signal added to the compound pixel signal increases the number of bits comprising the approximation signal. If a given number, i, of correction signals are used, the approximation signal will comprise a number of bits given by $(N+(M*2^i))$. After all correction signals have been incorporated into the approximation signal, a rounding signal is incorporated into the approximation signal, followed by a power-of-two normalization of the approximation signal. Normalization of a binary signal by a given power of two simply corresponds to right shifting the signal by a number of bit positions equal to that power of two. A fixed normalization is accomplished very easily in hardware by using a predetermined wiring pattern to select a set of most significant bits. Since the composite pixel signal comprises N bits, and the approximation signal comprises $(N+(M*2^i))$ bits, the approximation signal is right shifted by $(M*2^i)$ bits in creating the N-bit composite pixel signal. In other words, the lowest-order $(M*2^i)$ bits within the approximation signal are discarded. The rounding signal ensures that the $(M*2^i)$ lowest-order bits within the approximation signal are used to round the N highest-order bits within the approximation signal to correspond to a closest N-bit integer value. The N-bit composite pixel signal comprises the N highest-order bits of the $(N+(M*2^i))$ bit approximation signal after addition of the rounding signal, where the highest-order bit within the composite pixel signal is the highest-order bit within the approximation signal. Therefore, the rounding signal comprises $(N+(M*2^i))$ bits in which the highest-order bit within the $(M*2^i)$ bit group corresponds to a value of one.

Figure 2:
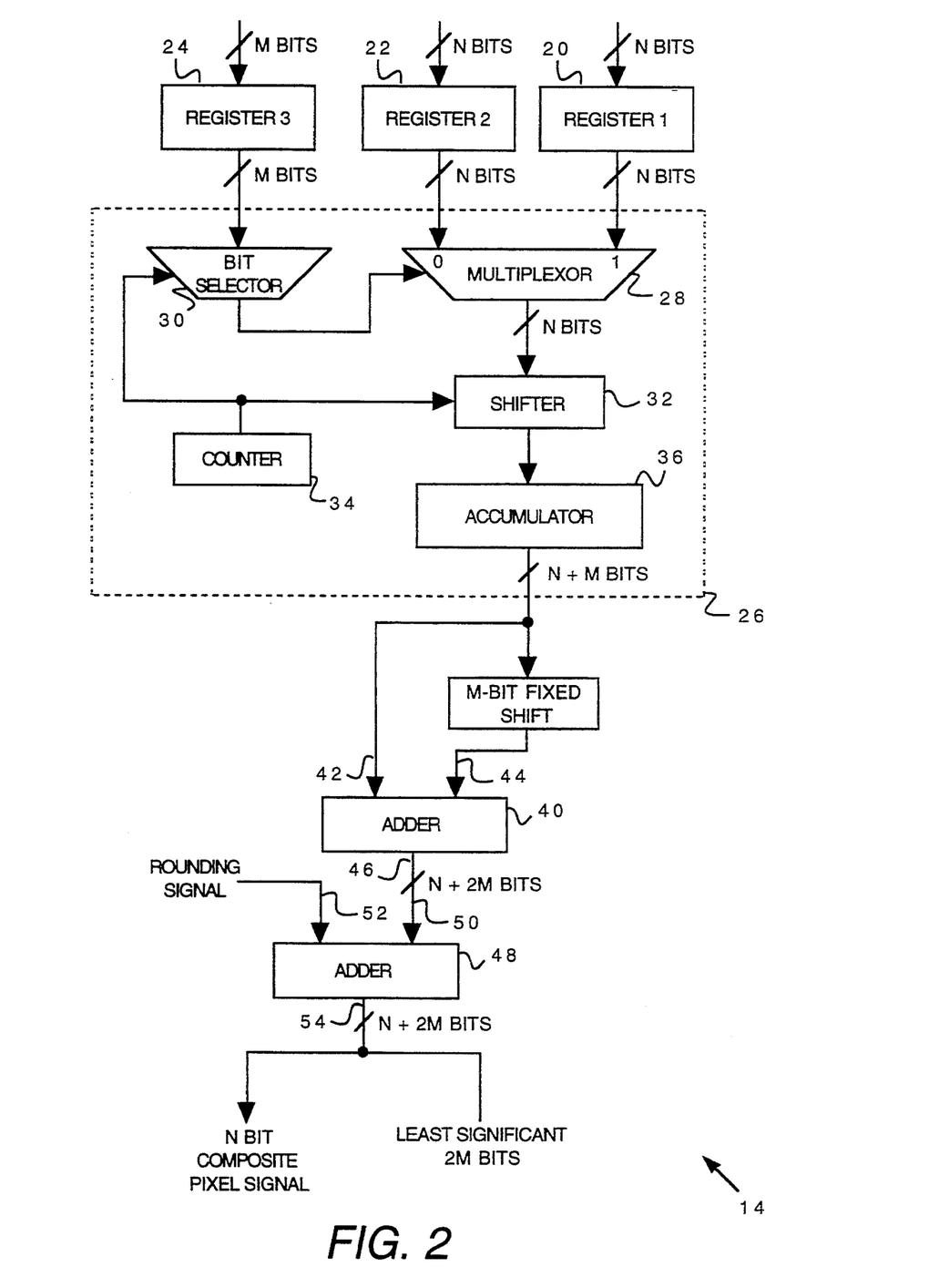
FIG. 2 is a block diagram of a first and preferred embodiment of a circuit constructed in accordance with the present invention.

Referring now to FIG. 2, a block diagram of a first and preferred embodiment of a circuit 14 constructed in accordance with the present invention is shown. The circuit 14 comprises a first register 20, a second register 22, and a third register 24; a signal selecting multiplier 26; a first adder 40; and a second adder 48. The present invention advantageously receives three values representing the foreground pixel, the background pixel, and the blending factor. These values are loaded into the first, second, and third registers 20, 22, 24, respectively. The present invention combines these values into a composite pixel signal that is output and used to generate the composite pixel on the display device. The first, second, and third registers 20, 22, 24 each have a plurality of inputs and a plurality of outputs, where each input and each output corresponds to one bit within the foreground pixel signal, the background pixel signal, and the blending factor signal, respectively. Each register receives a signal at its inputs, and stores a signal prior to its application to the signal selecting multiplier 26. The first and second register each comprise an N-bit signal storage means, and the third register comprises an M-bit signal storage means. In the preferred embodiment, N and M both equal 8, allowing the first, second, and third registers 20, 22, 24 to each store one byte of data. Representation of pixel signals with byte values is very common in image processing applications. If a full-color composite image is to be created, each pixel signal within the foreground image and the background image will comprise a byte corresponding to red, a byte corresponding to green, a byte corresponding to blue, and optionally a byte corresponding to opacity information. Each of these bytes must receive an identical set of operations in the blending.

The signal selecting multiplier 26 comprises a multiplexor 28 having a plurality of first inputs, a plurality of second inputs, a plurality of outputs, and a control input to which a signal is applied that determines whether a signal present at the plurality of first inputs or a signal present at the plurality of second inputs appears at the plurality of multiplexor 28 outputs; a bit selector 30 having a plurality of inputs, an output, and a selection input to which a signal is applied that causes a given bit within an input signal to appear at the bit selector 30 output; a shifter 32 having a plurality of inputs, a plurality of outputs, and a shift input to which a signal is applied that determines a number of bit positions by which a signal present the plurality of shifter 32 inputs is to be shifted prior to appearing at the plurality of shifter 32 outputs; a counter 34 having an output; and an accumulator having a plurality of inputs and a plurality of outputs. The multiplexor 28, the bit selector 30, the shifter 32, the counter 34, and the accumulator 36 form a signal summing means.

Each first input of the multiplexor 28 is coupled to an output within the plurality of first register 20 outputs, and each second input of the multiplexor 28 is coupled an output within the plurality of second register 22 outputs. Thus, each first input of the multiplexor 28 receives one bit within the N-bit foreground pixel signal, and each second input of the multiplexor 28 receives one bit within the N-bit background pixel signal. The multiplexor's control input is coupled to the output of the bit selector 30, and the plurality of multiplexor 28 outputs are coupled to the plurality of shifter 32 inputs. The multiplexor 28 receives the foreground pixel signal and the background pixel signal, and passes one of the two received signals to the shifter 32 based upon the signal present at its control input. If the value of the signal present at the multiplexor's control input equals one, the foreground pixel signal is routed to the outputs of the multiplexor 28; a signal having a value of zero at the control input causes the background signal to appear at the multiplexor 28 outputs. In the preferred embodiment, the multiplexor 28 comprises a plurality of two-to-one multiplexors.

The output of the counter 34 is coupled to the selection input of the bit selector 30 and to the shift input of the shifter 32. The counter 34 produces a count signal at its output that corresponds to a given bit position within the blending factor signal. The count signal is used to synchronize bit selection and shifting operations performed within the signal selecting multiplier 26. The counter 34 is incremented at regular intervals which are preferably referenced to a system clock. The counter 34 preferably comprises a plurality of D flip-flops and control logic in the present invention.

The inputs of the bit selector 30 are coupled to the outputs of the third register 24, such that each bit selector 30 input receives a bit within the M-bit blending factor signal. As the selection input of the bit selector 30 is coupled to the output of the counter 34, an increment of the counter 34 results in the selection of a given bit within the blending factor signal. Each bit within the blending factor signal is selected only one time. The selected bit appears at the bit selector 30 output. Since the multiplexor 28 control input is coupled to the output of the bit selector 30, the value of the selected bit at the output of the bit selector 30 determines whether the foreground pixel signal present at the multiplexor's plurality of first inputs or the background pixel signal present at the multiplexor's plurality of second inputs is applied to the plurality of shifter 32 inputs. In the preferred embodiment, the bit selector 30 preferably comprises an M-to-1 multiplexor, where M is the number of bits within the blending factor signal.

The plurality of shifter 32 inputs receive the signal present at the plurality of multiplexor 28 outputs. Thus, the signal present at the plurality of shifter 32 inputs is either the foreground pixel signal or the background pixel signal. The outputs of the shifter 32 are coupled to the inputs of the accumulator 36. A given count signal value received at the shift input indicates a number of bit positions the shifter 32 must left-shift the signal present at its inputs prior to delivering this signal to its outputs. As the given count signal corresponds to a bit position within the M-bit blending factor signal, the left-shift comprises shifting either the foreground pixel signal or the background pixel signal according to the position the bit currently selected by the bit selector 30 occupies within the blending factor signal. The shifter 32 must therefore be capable of left-shifting a signal present at its inputs by a total of M bit positions. Therefore, the plurality of shifter 32 outputs comprises (N+M) outputs. The shifter 32 preferably comprises a barrel shifter in the preferred embodiment.

The accumulator 36 receives the signal present at the outputs of the shifter 32, and incorporates this signal into a total. Each signal in the total is either the foreground pixel signal or the background pixel signal shifted left by a number of bit positions indicated by the count signal. Since the signal present at the output of the multiplexor 28 is shifted and incorporated into the total, each signal present at the multiplexor 28 output corresponds to a partial product signal. After each bit within the blending factor signal has been selected by the bit selector 30 according to the output of the counter 34, each partial product signal has been incorporated into the total and the accumulator 36 contents comprise the (N+M) bit compound pixel signal. The compound pixel signal represents the product of the foreground pixel signal and the blending factor signal, added to the product of the background pixel signal and the bitwise complement of the blending factor signal. The outputs of the accumulator 36 are coupled to the outputs of the signal selecting multiplier 28.

The first adder 40 has a plurality of first inputs 42, a plurality of second inputs 44, and a plurality of outputs 46. The plurality of first inputs are coupled to the plurality of signal selecting multiplier 26 outputs. The first adder 40 receives the compound pixel signal at its plurality of first inputs 42, to which it adds a first correction signal. In the preferred embodiment of the present invention, only one correction signal is used; therefore, the signal present at the first adder's plurality of outputs 46 is the approximation signal. The first correction signal is created from an M-bit right-shift of the compound pixel signal, and is applied to the first adder's plurality of second inputs 44. The first correction signal ensures that the approximation signal more closely corresponds to the normalization of the compound pixel signal by $(2^M-1)$. Each bit within the compound pixel signal is present in the first correction signal; therefore, the first correction signal comprises (N+2M) bits and the approximation signal comprises (N+2M) bits. Since the compound pixel signal is always shifted right by M bit positions in forming the first correction signal, this shift is implemented directly by a predetermined wiring pattern in the preferred embodiment. Implementation of the shift directly in wiring eliminates the need for a shift register or other hardware capable of performing the shift. Since additional hardware would require a given amount of time to shift the compound pixel signal, this reduces the time required to generate the composite pixel signal.

The second adder 48 has a plurality of first inputs 50, a plurality of second inputs 52, and a plurality of outputs 54. The plurality of first adder outputs 46 are coupled to the second adder's plurality of first inputs 50. The second adder 48 therefore receives the approximation signal at its first inputs 50. The rounding signal is applied to the second adder's plurality of second inputs 52. The addition of the rounding signal ensures that the 2M lowest-order bits within the approximation signal are used to round the N highest-order bits within the approximation signal to correspond to the closest N-bit integer value representing the composite pixel signal. The composite pixel signal therefore comprises the highest-order N bits of the approximation signal present at the outputs 54 of the second adder 48.

Figure 3:
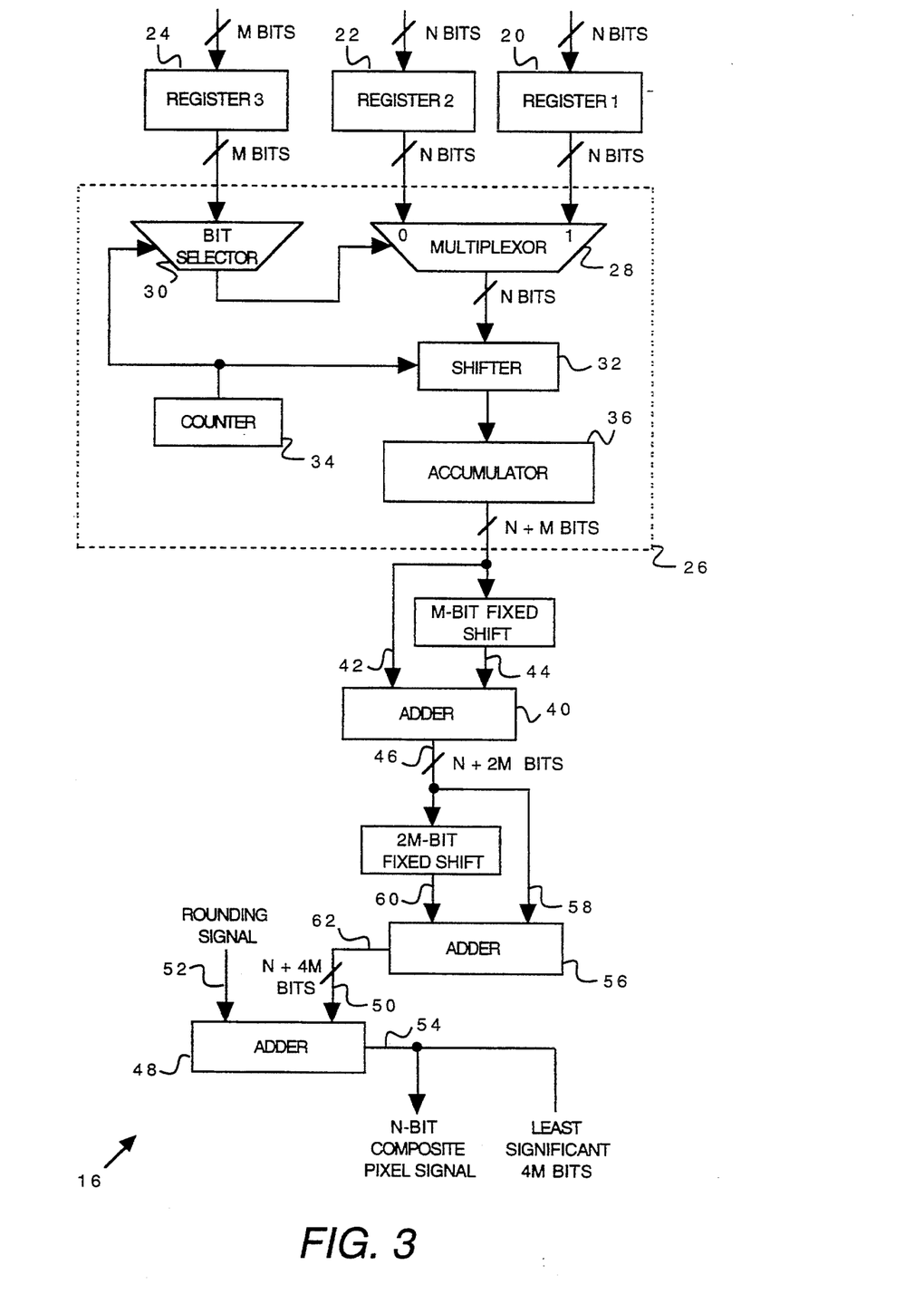
FIG. 3 is a block diagram of a second embodiment of a circuit constructed in accordance with the present invention.

In most blending situations, the composite pixel signal produced by the circuit 14 of the preferred embodiment of the present invention is accurate to an acceptable degree. However, additional correction signals can be incorporated into the approximation signal to maintain an even greater degree of accuracy. Referring now to FIG. 3, a second embodiment of a circuit 16 constructed in accordance with the present invention is shown. Similar parts have been identified with the same reference numbers used in FIG. 2 for ease of understanding. Relative to the preferred embodiment of the circuit 14 of the present invention, the second embodiment of the circuit 16 comprises a third adder 56 having a plurality of first inputs 58, a plurality of second inputs 60, and a plurality of outputs 62. The outputs 46 of the first adder 40 are coupled to the first inputs 58 of the third adder 58. The first inputs 58 of the third adder 56 therefore receive the signal generated by the first adder 40. The second inputs 60 of the third adder 56 receive a second correction signal that is created by performing a fixed (2*M)-bit right shift of the signal present at the outputs 46 of the first adder 40. Since the signal present at the outputs 46 of the first adder 40 is always right-shifted by (2*M) bits, this shift is implemented directly by a predetermined wiring pattern in the second embodiment. As in the case of the preferred embodiment, this eliminates the need for additional hardware and reduces the amount of time required to generate the composite pixel signal. The signal produced at the outputs 62 of the third adder is the approximation signal. Use of the second correction signal causes the approximation signal to more closely approach the value corresponding to normalization of the compound pixel signal by $(2^M-1)$ than use of only the first correction signal. The outputs 62 of the third adder 56 are coupled to the first inputs 50 of the second adder 48. The second inputs 52 of the second adder 48 receive the rounding signal. After its combination with the rounding signal, the N highest-order bits within the approximation signal comprise the composite pixel signal.

In the preferred embodiment of the circuit 14, the count signal generated at the output of the counter 34 sequentially determines which bit within the blending factor signal specifies that the foreground pixel signal or the background pixel signal should be incorporated into the compound pixel signal. If each bit comprising the blending factor signal were used simultaneously to select either the foreground pixel signal or the background pixel signal, the partial product signals could be generated in parallel in a single system clock cycle, after which each partial product signal could be combined in parallel to create the compound pixel signal.

Figure 4:
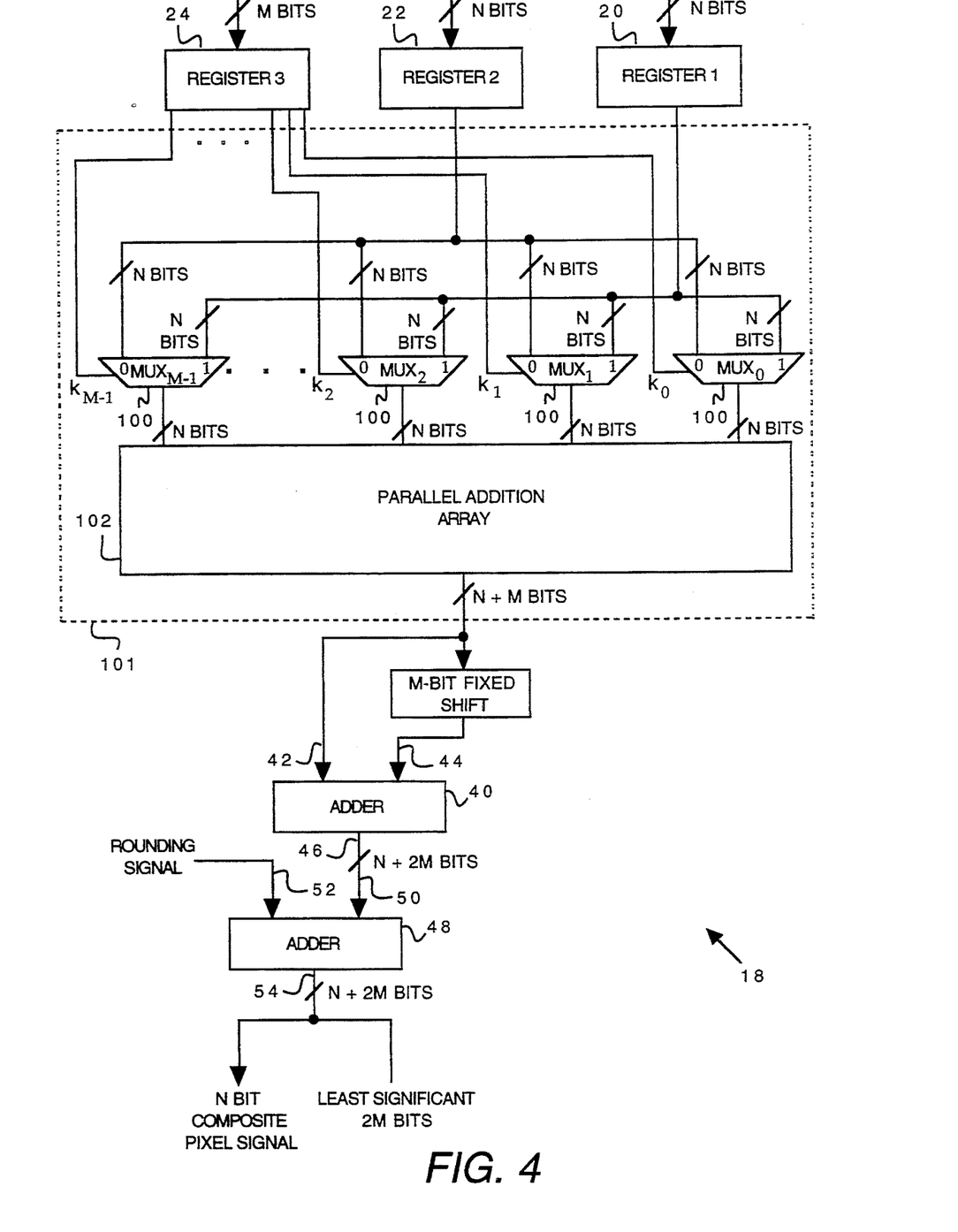
FIG. 4 is a block diagram of a third embodiment of a circuit constructed in accordance with the present invention.

Referring also now to FIG. 4, a third embodiment of a circuit 18 constructed in accordance with the present invention is shown. With the exception of an alternate signal selecting multiplier 101, the circuit 18 of the third embodiment comprises elements that are identical to those that comprise the circuit 14 of the preferred embodiment of the present invention. The signal selecting multiplier 101 of the third embodiment generates and combines partial product signals in parallel. The signal selecting multiplier 101 comprises a plurality of multiplexors 100, each multiplexor 100 corresponding to a bit within the blending factor signal, and each multiplexor 100 having a plurality of first inputs, a plurality of second inputs, a plurality of outputs, and a control signal input to which a signal is applied that determines whether a signal present at the plurality of first inputs or a signal present at the plurality of second inputs appears at the plurality of multiplexor 100 outputs; and a parallel addition array 102 having a plurality of inputs, and a plurality of outputs.

Each input within the plurality of first inputs of each multiplexor 100 is coupled to each output within the plurality of first register 20 outputs, and each input within the plurality of second inputs of each multiplexor 100 is coupled to each output within the plurality of second register 22 outputs. Therefore, the plurality of first inputs of each multiplexor 100 receive the foreground pixel signal, and the plurality of second inputs of each multiplexor 100 receive the background pixel signal. Each output of the third register 24 is coupled to a control signal input of a corresponding multiplexor 100. As each output of the third register corresponds to a specified bit $k_S$ within the blending factor signal k, where s ranges from 0 to (M−1), each multiplexor 100 also corresponds to a given $k_S$. Thus, each multiplexor 100 can be labeled as $MUX_S$. Each specified bit $k_S$ therefore determines whether the foreground pixel signal or the background pixel signal appears at the plurality of $MUX_S$ outputs. Each bit $k_S$ within the blending factor signal corresponds to a binary value multiplied by $2^S$. Therefore, a signal $P_S$ present at the plurality of outputs of each multiplexor 100 $MUX_S$ corresponds to either the foreground pixel signal or the background pixel signal multiplied by $2^S$. Each $P_S$ is therefore a partial product signal. In the third embodiment, each multiplexor 100 preferably comprises a plurality of two-to-one multiplexors.

The plurality of outputs of each multiplexor 100 are coupled to the plurality of inputs of the parallel addition array 102. The parallel addition array 102 comprises an array of adders, and serves as a parallel signal summing means. Within the parallel addition array 102, the foreground and/or background pixel signals received from each multiplexor's plurality of outputs are combined in a parallel summation. The foreground or background pixel signal received from $MUX_S$ must be weighted by $2^S$ in the summation. Multiplication by $2^S$ simply corresponds to an s-bit leftshift. Therefore, each foreground or background pixel signal $P_S$ present at the plurality of parallel addition array 102 inputs must receive a fixed s-bit left shift prior to its incorporation into the summation. As each s-bit shift is a fixed shift, this corresponds to a predetermined wiring pattern in the third embodiment. This eliminates the need for additional shifting hardware, and reduces the time required to generate the compound pixel signal and thus the composite pixel signal.

The adders within the parallel addition array 102 sum each appropriately shifted $P_S$ into a total. This total represents the compound pixel signal. The compound pixel signal comprises (N+M) bits. Each $P_S$ comprises N bits; therefore, each $P_S$ can be represented bitwise as $P_{st}$, where s ranges from 0 to (M−1) and t ranges from 0 to (N−1). If the compound pixel signal is represented bitwise as $C_j$, where j ranges from 0 to (N+M−1), each compound pixel signal bit $C_j$ is formed from the sum of all $P_{st}$ such that (s+t)=j, plus any carry resulting from the generation of $C_{j-1}$. The array of adders within the parallel adder array are coupled in a manner which results in the generation of each $C_j$.

Within the signal selecting parallel multiplier 101, the partial product signals $P_S$ are generated in parallel and combined in parallel. This allows each blending to be performed very quickly; however, the signal selecting parallel multiplier 101 requires much more hardware than the signal selecting serial multiplier 26, which adversely affects economic aspects of circuit construction.

Figure 5:
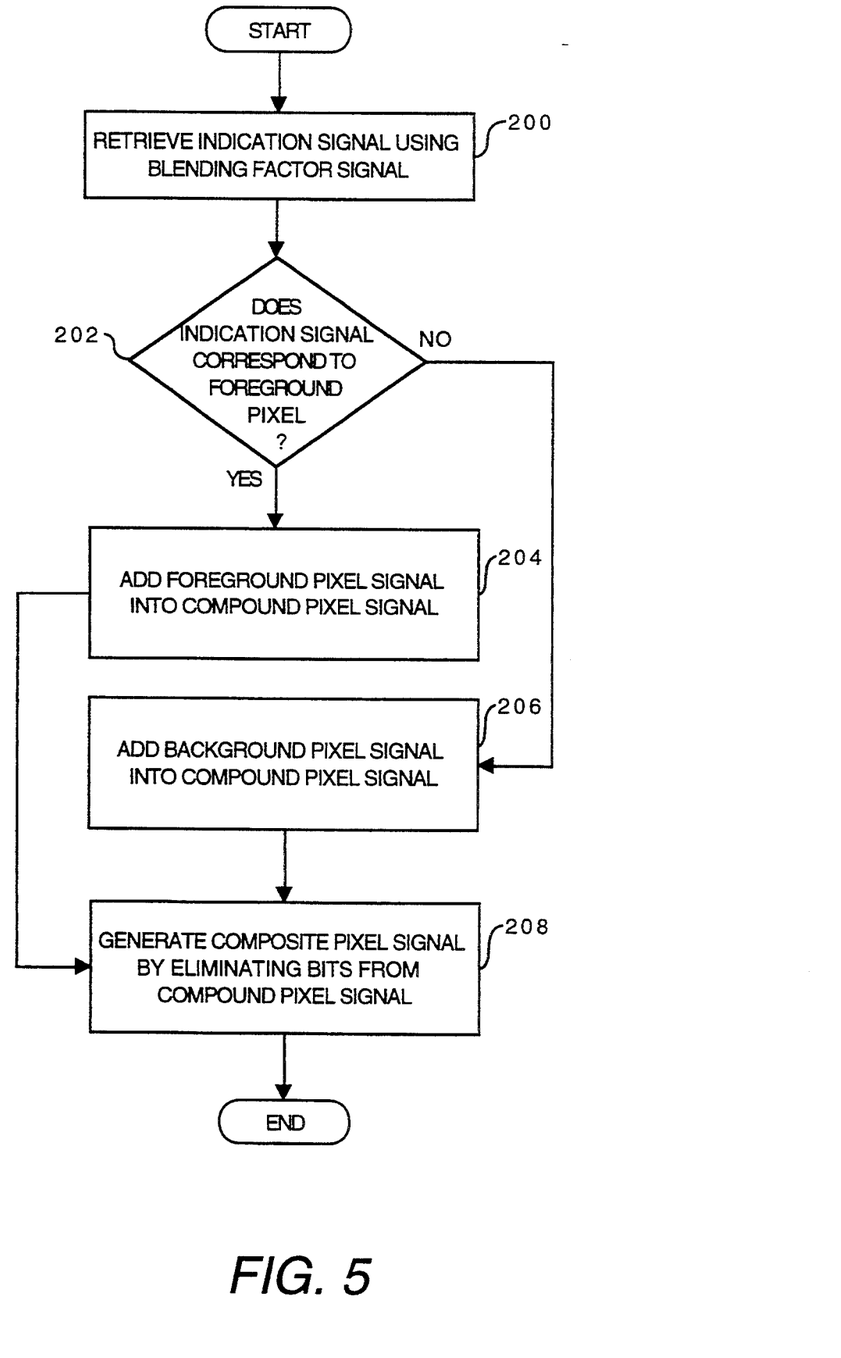
FIG. 5 is a flowchart of a first method of the present invention.

Referring now to FIG. 5, a first method for forming a composite image pixel according to the unique pixel blending method of the present invention is shown. The method begins in step 200 by retrieving an indication signal using the blending factor. The blending factor preferably comprises one or more bits, and the indication signal corresponds to at least one bit. Next, in step 202, the method determines to which pixel signal the indication signal corresponds to. If the indication signal corresponds to the foreground pixel signal, the method adds the foreground pixel into a compound pixel signal in step 204. If the indication signal corresponds to the background pixel signal, the method adds the background pixel signal into the compound pixel signal in step 206. After either step 204 or step 206, the method next generates a composite pixel signal by eliminating bits from the compound pixel signal in step 208, after which the method ends. In the first method for forming a composite image pixel through pixel blending, the signal corresponding to the blending factor preferably comprises a plurality of subsignals, where each subsignal corresponds to a bit. For each pixel blending, the first method of the present invention is repeated for each subsignal comprising the blending factor.

Figure 6:
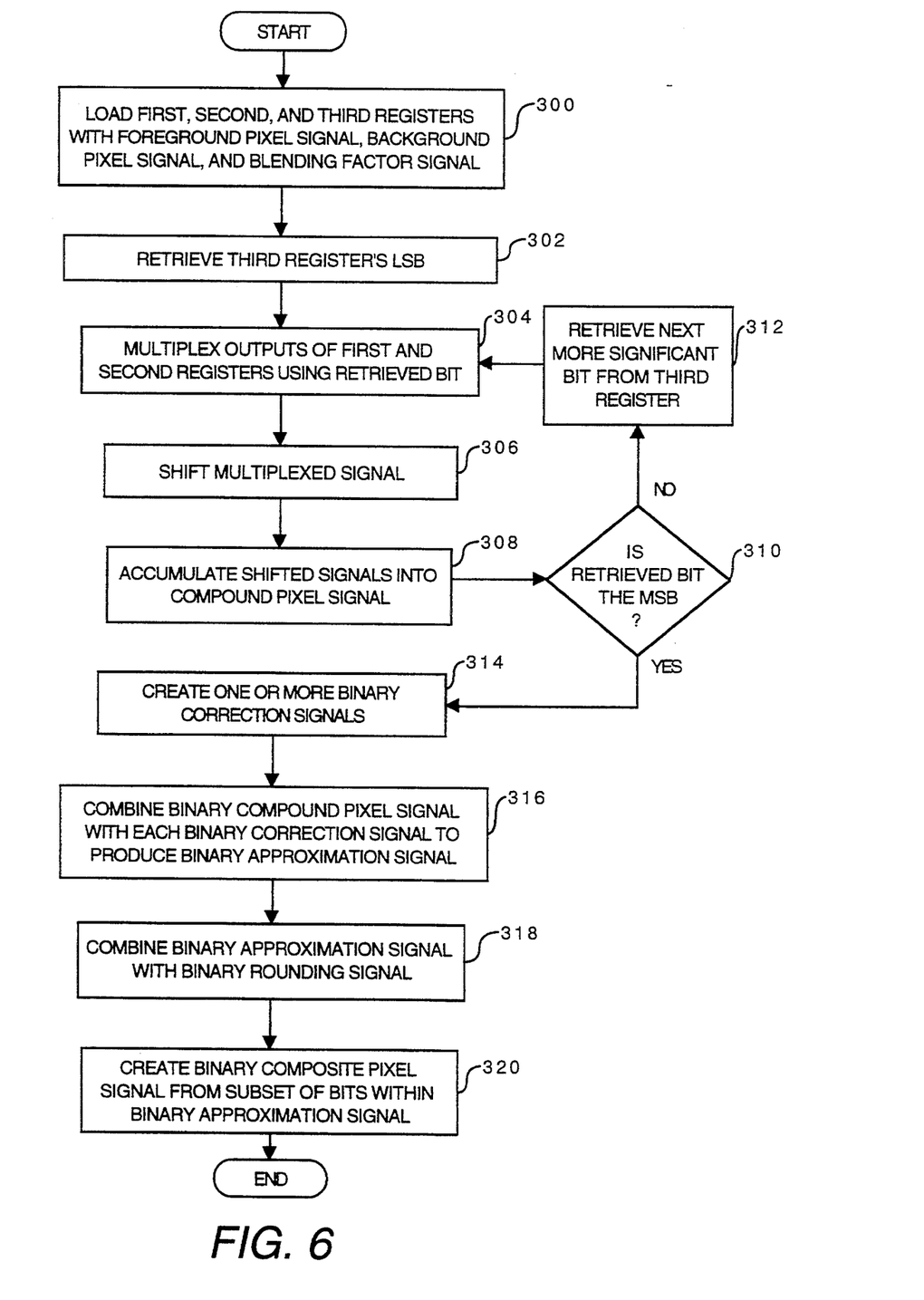
FIG. 6 is a flowchart of a second and preferred method of the present invention.

A second and preferred method for forming a composite image pixel through pixel blending comprises the steps shown in the flowchart of FIG. 6. The preferred method begins in step 300 with loading a first register with the foreground pixel signal, loading a second register with the background pixel signal, and loading a third register with a blending factor signal. In step 302, the preferred method retrieves the least significant bit from the third register. Step 304 in the preferred method next multiplexes the outputs of the first and second registers. The multiplexing is controlled by the retrieved bit. Next, in step 306, the preferred method shifts the multiplexed signal by a number of bit positions corresponding to the significance of the retrieved bit. The shifted signal is next accumulated into a compound pixel signal in step 308. Those skilled in the art will recognize that the steps of shifting and accumulating can be performed in reverse order to reduce a given implementation's hardware requirements. Following step 308, the preferred method determines whether the retrieved bit is the MSB of the third register in step 310. If it is not, the preferred method retrieves the next more significant bit from the third register in step 312, after which the method returns to step 304. Steps 304 through 312 are repeated for each bit present within the output of the third register. If the retrieved bit is the MSB of the third register, the preferred method proceeds to step 314, wherein one or more correction signals are created, each of which comprises the compound pixel signal right-shifted by a multiple of the number of bits comprising the blending factor signal. Next, in step 316, the preferred method adds the compound pixel signal with each correction signal to produce an approximation signal. In step 318, a rounding signal and the approximation signal are added together. Steps 316 and 318 ensure that a subset of bits within the approximation signal correspond to an integer having a value that represents an accurate blending. Following step 318, the preferred method creates the composite pixel signal from the subset of bits within the approximation signal in step 320, after which the preferred method ends.

Figure 7:
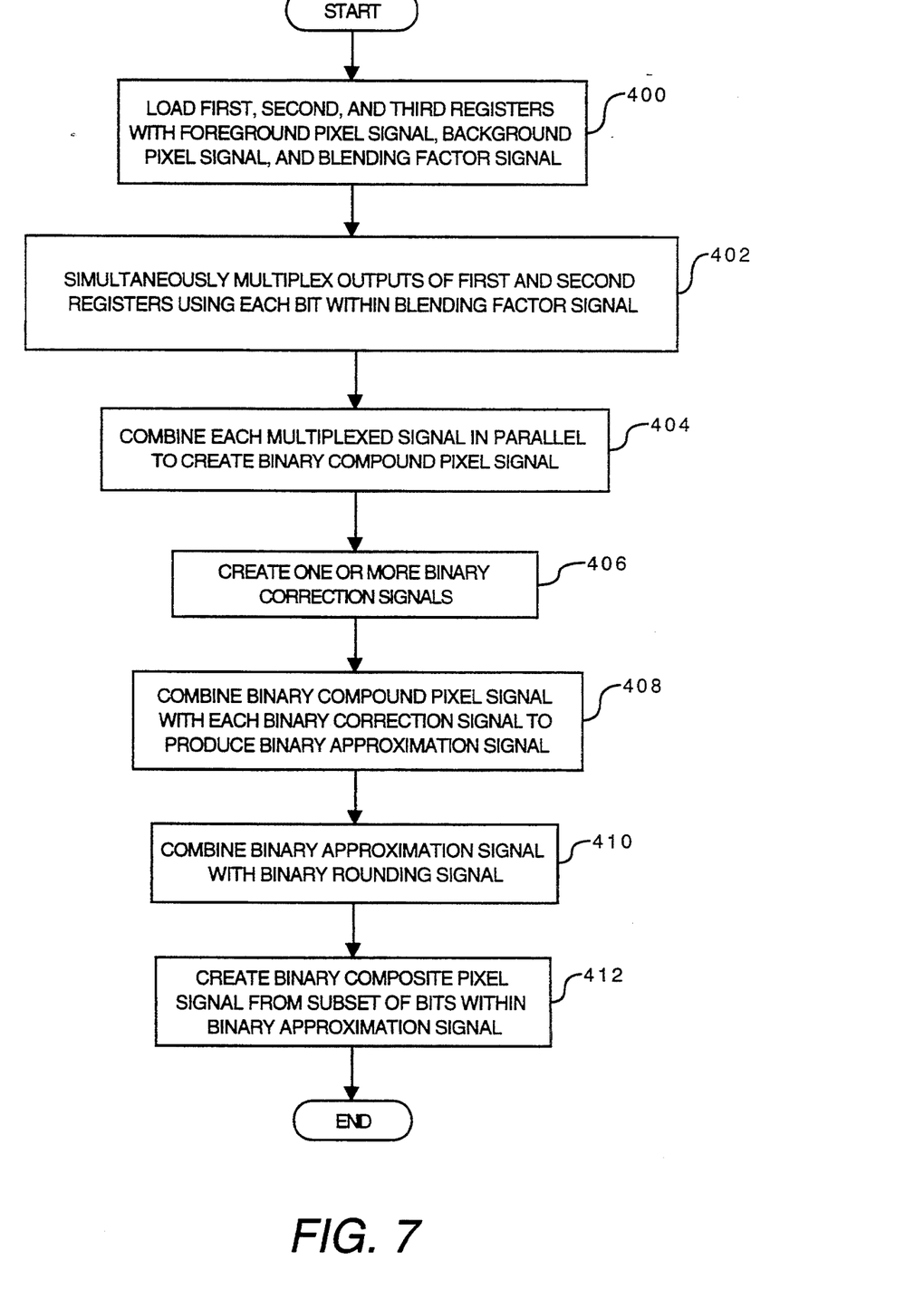
FIG. 7 is a flowchart of a third method of the present invention.

Referring now to FIG. 7, a third method for forming a composite image pixel through pixel blending is shown. The third method of the present invention begins in step 400 with loading a first register with the foreground pixel signal, a second register with the background pixel signal, and a third register with a blending factor signal. In step 402, the third method simultaneously uses each bit within the blending factor signal to multiplex the outputs of the first and second registers. In this step, each bit within the blending factor signal individually controls a corresponding multiplexor. In step 404, the third method combines the multiplexed signals through shifting followed by additions to create the compound pixel signal. In step 406, the third method creates one or more correction signals, each of which comprises the compound pixel signal right-shifted by a multiple of the number of bits comprising the blending factor signal. Next, in step 408, the third method combines the compound pixel signal with each correction signal to produce a approximation signal. In step 410, a rounding signal and the approximation signal are combined. Steps 408 and 410 ensure that a subset of bits within the approximation signal correspond to an integer having a value that represents an accurate blending. Following step 410, the third method creates the composite pixel signal from the subset of bits within the approximation signal in step 412, after which the third method ends.

While the present invention has been described with reference to certain preferred embodiments, those skilled in the art will recognize that various modifications may be provided. For example, modifications might include, but would not be limited to, implementing the first and second registers as shift registers, thereby eliminating the need for a shifter within the signal selecting multiplier in the preferred embodiment; or a signal selecting multiplier implementation based upon a Wallace tree parallel multiplier. These and other variations upon and modifications to the preferred embodiments are provided for by the present invention which is limited only by the following claims.

What is claimed is:

1. A circuit for forming a composite image pixel through pixel blending, the blending comprising the combination of a foreground pixel signal and a background pixel signal relative to a blending factor signal to create the composite pixel, the circuit comprising:

a signal selecting multiplier having a plurality of first inputs, a plurality of second inputs, a plurality of third inputs and a plurality of outputs, for generating a compound pixel signal from a combination of the foreground pixel and the background pixel signals, wherein the foreground pixel signal is combined with the background pixel signal relative to the blending factor signal, the plurality of first inputs receiving the foreground pixel signal, the plurality of second inputs receiving the background pixel signal, and the plurality of third inputs receiving the blending factor signal;

a first adder having a plurality of first inputs, a plurality of second inputs, and a plurality of outputs, for modifying the signal generated by the signal selecting multiplier, the plurality of first inputs of the first adder coupled to the plurality of outputs of the signal selecting multiplier, the plurality of second inputs of the first adder coupled to receive a first correction signal; and a second adder having a plurality of first inputs, a plurality of second inputs, and a plurality of outputs, for generating a composite pixel signal from the Output of the first adder, the plurality of first inputs of the second adder coupled to the plurality of outputs of the first adder, the plurality of second inputs of the second adder coupled to receive a rounding signal.

2. The circuit of the present invention according to claim 1, wherein the signal selecting multiplier comprises:

a multiplexor having a control signal input, a plurality of first inputs, a plurality of second inputs, and a plurality of outputs, for generating a partial product signal corresponding to each bit within the blending factor signal, the plurality of first inputs of the multiplexor coupled to the plurality of first inputs of the signal selecting multiplier, and the plurality of second inputs of the multiplexor coupled to the plurality of second inputs of the signal selecting multiplier;

a bit selector having a plurality of inputs, an output, and a selection input, for selecting a bit corresponding to the blending factor signal, the plurality of bit selector inputs coupled to the plurality of third inputs of the signal selecting multiplier, and the output of the bit selector coupled to the control input of the multiplexor;

a shifter having a plurality of inputs, a plurality of outputs, and a shift input, for shifting each partial product signal, the plurality of shifter inputs coupled to the plurality of multiplexor outputs;

a counter having an output, for synchronizing the operation of the bit selector and the shifter, the output of the counter coupled to the selection input of the bit selector and to the shift input of the shifter; and an accumulator having a plurality of inputs and a plurality of outputs, for accumulating shifted partial product signals, the plurality of accumulator inputs coupled to the plurality of shifter outputs, the plurality of accumulator outputs coupled to the plurality of signal selecting multiplier outputs.

3. The circuit of the present invention according to claim 1, wherein the signal selecting multiplier comprises:

a plurality of multiplexors, each multiplexor having a plurality of first inputs, a plurality of second inputs, a plurality of outputs, and a control input, each multiplexor generating a partial product signal, the plurality of first inputs of each multiplexor receiving the foreground pixel signal, the plurality of second inputs of each multiplexor receiving the background pixel signal, and the control input of each multiplexor coupled to a respective input within the plurality of third inputs of the signal selecting multiplier; and a parallel addition array having a plurality of inputs and a plurality of outputs, the parallel addition array for performing a parallel combination of each partial product signal, the plurality of parallel addition array inputs coupled to the plurality of outputs of each multiplexor, the plurality of parallel addition array outputs coupled to the plurality of signal selecting multiplier outputs.

4. The circuit of claim 1, wherein the first correction signal comprises the compound pixel signal shifted right by a number of bit positions corresponding to the number of bits within the blending factor signal.

5. The circuit of claim 1, further comprising a third adder having a plurality of first inputs, a plurality of second inputs, and a plurality of outputs, the third adder for further modifying the signal produced by the signal selecting multiplier, the plurality of first inputs of the third adder coupled to the plurality of first adder outputs, and the plurality of third adder outputs coupled to the plurality of first inputs of the second adder.

6. The circuit of claim 5, wherein the plurality of second inputs of the third adder receive a second correction signal, the second correction signal comprising the compound pixel signal shifted right by a number of bit positions corresponding to a multiple of the number of bits within the blending factor signal.

7. The circuit of claim 1, wherein the composite pixel signal comprises a subset of bits within the approximation signal after its combination with the rounding signal.

8. The circuit of claim 7, wherein the highest-order bit within the composite pixel signal is the highest-order bit of the approximation signal.

9. A method for composite pixel generation from a foreground pixel signal and a background pixel signal relative to a blending factor signal, the method comprising:

retrieving an indication signal using the blending factor signal;

determining the pixel signal corresponding to the indication signal;

if the indication signal corresponds to the foreground pixel signal, adding the foreground pixel signal into a compound pixel signal;

if the indication signal corresponds to the background pixel signal, adding the background pixel signal into the compound pixel signal; and generating a composite pixel signal from the compound pixel signal.

10. The method of claim 9, where the blending factor signal is comprised of a plurality of subsignals, the method being repeated for each subsignal.

11. A method for forming a composite pixel from a foreground pixel signal and a background pixel signal relative to a blending factor signal, the method comprising the steps of:

loading a first register with the foreground pixel signal, loading a second register with the background pixel signal, and loading a third register with the blending factor signal;

multiplexing the outputs of the first and second registers;

shifting the multiplexed signal;

accumulating the shifted signal to produce a compound pixel signal; and normalizing the compound pixel signal to produce a composite pixel signal.

12. The method of claim 11, wherein the multiplexing is controlled by a given bit within the blending factor signal.

13. The method of claim 12, wherein the output of a counter is used to select the given bit within the blending factor to control the multiplexing.

14. The method of claim 12, wherein the shifting of the multiplexed signal is a left-shift corresponding to the significance of the given bit within the blending factor signal that controls the multiplexing.

15. The method of claim 11, wherein the normalization step comprises the substeps of:

creating one or more correction signals;

combining the compound pixel signal with each correction signal to produce an approximation signal;

combining the approximation signal with a rounding signal to adjust the approximation signal to a closest integer value; and selecting a portion of the approximation signal corresponding to the integer value as a composite pixel signal.

16. The method of claim 15, wherein the correction signal is created from a fixed shift of the compound pixel signal by a number of bit positions corresponding to a multiple of the number of bits comprising the blending factor signal.

17. The method of claim 15, wherein the highest-order bit within the composite pixel signal is the highest-order bit within the approximation signal.

18. A method for composite pixel generation from a foreground pixel signal and a background pixel signal relative to a blending factor signal, the method comprising the steps of:

loading a first register with the foreground pixel signal, loading a second register with the background pixel signal, and loading a third register with the blending factor signal;

multiplexing the outputs of the first and second registers in parallel;

performing a parallel addition of the multiplexed signals to generate a compound pixel signal; and normalizing the compound pixel signal to produce a composite pixel signal.

19. The method of claim 18, wherein the multiplexing is controlled by the bits within the blending factor signal.

20. The method of claim 18, wherein the normalization step comprises the substeps of:

creating one or more correction signals;

combining the compound pixel signal with each correction signal to produce a approximation signal;

combining the approximation signal with a rounding signal to adjust the approximation signal to a closest integer value; and selecting a portion of the approximation signal corresponding to the integer value as the composite pixel signal.

21. The method of claim 20, wherein each correction signal is created from a fixed shift of the compound pixel signal by a number of bit positions corresponding to a multiple of the number of bits comprising the blending factor signal.

22. The method of claim 20, wherein the highest-order bit within the approximation pixel signal is the highest-order bit within the composite pixel signal.

* * * * *